United States Patent [19]

Steffes et al.

[11] Patent Number: 5,681,099
[45] Date of Patent: Oct. 28, 1997

[54] ELECTROHYDRAULIC PRESSURE CONTROL DEVICE

[75] Inventors: Helmut Steffes, Hattersheim; Hans-Dieter Reinartz, Franfurt am Main, both of Germany

[73] Assignee: ITT Automotive Europe GmbH, Germany

[21] Appl. No.: 545,747

[22] PCT Filed: Apr. 21, 1994

[86] PCT No.: PCT/EP94/01233

§ 371 Date: Nov. 1, 1995

§ 102(e) Date: Nov. 1, 1995

[87] PCT Pub. No.: WO94/26568

PCT Pub. Date: Nov. 24, 1994

[30] Foreign Application Priority Data

May 7, 1993 [DE] Germany ............ 43 15 206.6

[51] Int. Cl.$^6$ ............................................. B60T 8/36
[52] U.S. Cl. .............................. 303/119.2; 137/884
[58] Field of Search ................. 303/119.2; 137/596.16, 137/596.17, 884; 251/129.01, 129.15, 129.21

[56] References Cited

U.S. PATENT DOCUMENTS

| 1,815,212 | 7/1931 | Ogg . | |
|---|---|---|---|
| 4,888,572 | 12/1989 | Tinley | 336/65 |
| 4,916,806 | 4/1990 | Lorenzen | 29/837 |

FOREIGN PATENT DOCUMENTS

| 0105219 | 4/1984 | European Pat. Off. . |
| 0499670 | 8/1992 | European Pat. Off. . |
| 457575 | 3/1928 | Germany . |
| 3338675 | 5/1985 | Germany . |
| 3440103 | 5/1986 | Germany . |
| 3539037 | 6/1987 | Germany . |
| 3725385 | 2/1989 | Germany . |
| 3742830 | 7/1989 | Germany . |
| 3834590 | 4/1990 | Germany . |
| 3836405 | 5/1990 | Germany . |
| 8815427 | 5/1990 | Germany . |
| 4001017 | 7/1991 | Germany . |
| 4018179 | 12/1991 | Germany . |
| 4100967 | 7/1992 | Germany . |
| 4108079 | 9/1992 | Germany . |
| 8910286 | 11/1989 | WIPO . |
| 9110583 | 7/1991 | WIPO . |
| 9212878 | 8/1992 | WIPO . |

OTHER PUBLICATIONS

Pneumatische Mikro–Einbauventile Article by Wolf–Dieter Goedecke.

*Primary Examiner*—Peter M. Poon
*Attorney, Agent, or Firm*—J. Gordon Lewis; Thomas N. Twomey

[57] ABSTRACT

An electrohydraulic pressure control device including a plurality of electromagnetically operable hydraulic valves (solenoid valves) which are arranged on a valve-accommodating member in a block-type manner, coils which project from the valve accommodating member. The coils including injection-molded cables on their parts projecting from the valve-accommodating member, a cover which covers the projecting coil parts and the cables, a carrier element to accommodate the coils which is arranged within the cover, with the carrier element including a plurality of openings into which a plurality of anchoring members fitted to the coils are form-locking engaged, and with the electric cables being relieved from tensile load.

10 Claims, 2 Drawing Sheets 5,681,099

ELECTROHYDRAULIC PRESSURE CONTROL DEVICE

TECHNICAL FIELD

The present invention relates to an electrohydraulic pressure control device and particularly relates to electrohydraulic pressure control devices used in vehicle braking application.

BACKGROUND OF THE INVENTION

Electrohydraulic pressure control devices are known in the art. As an example, the various embodiments in international publication WO 92/12878 are referred to wherein, apart from the sufficiently known modular construction of the valve-accommodating member, the cover is subdivided by means of a plate-shaped carrier element in order to accommodate an electronic controller, on the one hand, and to establish the electrical connection between the electronic controller and the contact elements projecting from the solenoid valves, on the other hand. The cover along with the coils of the solenoid valves is plugged onto the valve domes of the valve-accommodating member, and plug contacts engage into each other for providing the electrical connection between the contact elements and the electronic controller integrated in the cover.

It is desirable to modify the previously described pressure control device with respect to the attachment of the valve coils in the cover and with respect to a simplified and reliable electrical connection of the coils with the control electronics with a view to simplifying the manufacture, function test and repair.

Thus, an object of the present invention is to expediently redesign the pressure control device known from the above mentioned state of the art in order to provide a compact and functionally optimized pressure control device which permits being manufactured, tested and maintained as easily as possible, and wherein different heat expansions of the component parts and stress from the outside can be absorbed with least possible tension.

This object is achieved wherein the carrier element has a plurality of openings into which a plurality of anchoring means on the coils are engaged in a form-locking manner, with the electric contact elements of the coils being relieved from tensile load.

DETAILED DESCRIPTION OF THE PREFERRED EMBODIMENTS

Figure 1:
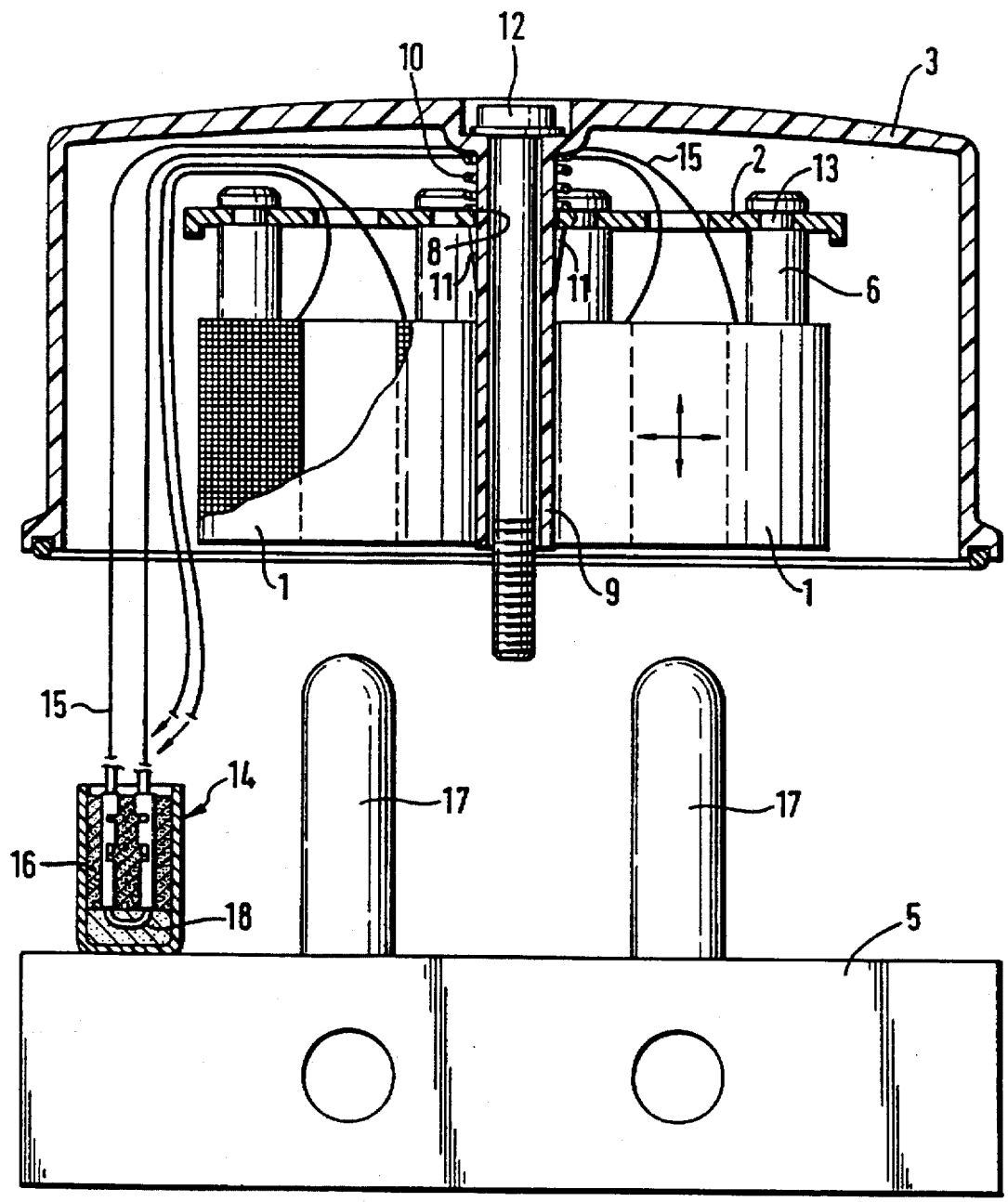
FIG. 1 is a partial cross-sectional side view of the pressure control device according to the present invention.

FIG. 1 shows a side view of the pressure control device according to the present invention in which the basic components are sketched. The pressure control device shown comprises a cover 3, shown in a profiled section, and a block-shaped valve-accommodating member 5 made of steel or light metal. At its centrally arranged bushing-shaped extension 9 directed into the cover 3, the cover 3 accommodates a horizontal plastic plate referred to as carrier element 2. The plastic plate is made of epoxy fiberglass material, and extension 9 extends through bore 8 which is centrally positioned in the plastic plate such that sufficient general movability of the carrier element 2 is ensured in spite of a form-lock between bore 8 and extension 9. This permits unimpeded centering of the coils 1 attached to the carrier element 2 in relation to the valve domes 17 of the valve-accommodating member 5. The form-lock between the bore 8 and the extension 9 is caused by a form-locking means 11 acting as a clip. For the form-locking attachment of the coils 1 to the carrier element 2, cylindrical pins are used as anchoring means 6 which are positioned in pairs on the coils 1 and have annular grooves 13. The anchoring means 6 engage into keyhole-shaped openings 4 in the carrier element 2. The coils 1, which are thus fixed to the carrier element 2, can be aligned by the clearance of the extension 9 in the bore 8 of the carrier element 2 in the necessary range of assembly tolerances.

A compression spring 10 compressed between the carrier element 2 and the cover 3 ensures yielding axial alignment of the coils 1 in relation to the valve-accommodating member 5. Expediently, the compression spring 10 is slipped over the extension 9 and guided radially thereby. In addition, the extension 9 accommodates a screw 12 for attaching the cover 3 to the valve-accommodating member 5. Each coil 1 has two water-tight, injection-molded cables as contact elements. The cables extend directly to the cable connector 14. Advantageously, there is no need for soldered points. Thus, single untensioned cables 15 are attached to the coils 1 which are adapted to be plugged or soldered in a cable connector 14 on the valve-accommodating member 5 and, along with the contact carrier 18, are enclosed by a sealing compound 15 within a cap of the cable connector 14 in an anti-corrosion manner. The cap of the cable connector 14 has a substantially U-shaped supporting profile and forms a frame for accommodating the contact carrier 18 and the cable plug connection or soldered cable connection embedded in the sealing compound 16.

Figure 2:
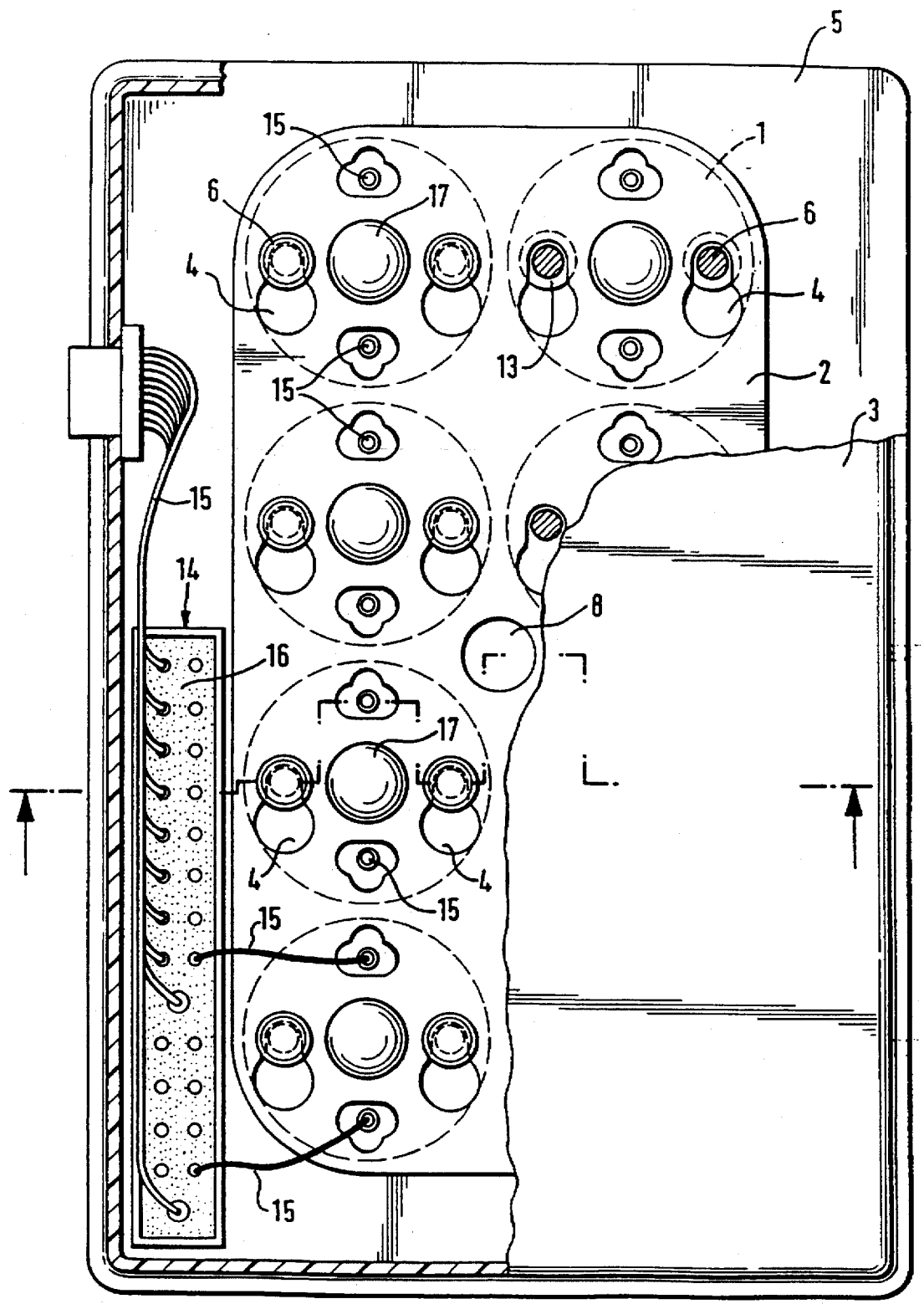
FIG. 2 is a top view of the pressure control device.

FIG. 2 shows a top view of the carrier element 2 which is aligned relative to the valve domes 17 on the valve-accommodating member 5. A total view of the cover 3 connected to the carrier element 2 was omitted for the sake of illustrating the details which are essential for the present invention. Laterally in relation to the two coil rows, the frame-shaped cable connector 14 with the single cables 15 is positioned which extend to the coils 1 or to a peripherally arranged control electronics and are enclosed by the sealing compound 16. The carrier element 2 accommodates in its keyhole-shaped openings 4 the cylindrical pins fixed to the coils 1. The valve domes 17 and the cables 15 leading to the coils 1 extend through the punched-out apertures in the carrier element 2 disposed between the keyhole-shaped openings 4. Bore 8, which is positioned centrally in the carrier element 2, serves to fix the extension 9 of the cover 3.

An essential advantage of the present invention is the inexpensive small-volume accommodation of the sealing compound in the cable connector 14 which permits unimpeded movability of the elastic coil connection fitted to the cover 3 due to the untensioned cables 15, irrespective of whether there is a soldered cable connection or a cable plug connection. In addition, using a cable connector 14 positioned between the electric coil contacts and the periphery renders it possible to specifically choose a cable for connecting a peripheral cable loom which conforms to the respective application. There is no need for large-volume injection-molding or casting around the coil attachment in the cover, thereby providing a compact and functionally optimized pressure control device.

What is claimed is:

1. A braking pressure control device, of the type including electromagnetically operable hydraulic valves arranged in a block on a valve-accommodating member in a block-type manner, wherein coils project from the valve-accommodating member, the coils having electric contact elements on their parts projecting from the valve-accommodating member, a cover which covers the projecting coil parts and the contact elements, a carrier element on which the coils are fixed in a carrying manner and which is arranged within the cover, the cover or part of the cover being provided as an electronic controller or as a part for an electronic controller, comprising:

a plurality of openings defined by said carrier element into which a plurality of anchoring means are fitted to the coils and are engaged in a form-locking manner, and in that the electric contact elements are provided as cables.

2. Electrohydraulic pressure control device as claimed in claim 1, wherein the carrier element and the coils are retained elastically in the cover.

3. Electrohydraulic pressure control device as claimed in claim 1 wherein the carrier element has a centrally positioned bore through which an extension fitted to the cover and retaining the carrier element extends.

4. Electrohydraulic pressure control device as claimed in claim 3, wherein the extension on the cover is provided with at least one form-locking means which extends through at least one central bore in the carrier element for elastically connecting the carrier element with the coils in the cover.

5. Electrohydraulic pressure control device as claimed in claim 4, wherein the extension is substantially shaped like a bushing for accommodating a screw which fixes the cover to the valve-accommodating member.

6. Electrohydraulic pressure control device as claimed in claim 1 wherein the openings in the carrier element have a keyhole form for accommodating the coils.

7. Electrohydraulic pressure control device as claimed in claim 6, wherein the anchoring means of the coils on the carrier element is formed of cylindrical pins furnished with grooves, with the carrier element engaging with its key-shaped openings into the grooves.

8. Electrohydraulic pressure control device as claimed in claim 1 wherein the carrier element is supported by a compression spring compressed between the carrier element and the cover.

9. Electrohydraulic pressure control device as claimed in claim 1, wherein the carrier element is made of an epoxy fiberglass plate.

10. Electrohydraulic pressure control device as claimed in claim 1, wherein the cables of the coils are connected to a cable connector arranged within the cover in a fashion relieved from tensile load, and in that further cable connections are arranged within the cable connector which are adapted to be plugged or soldered with the cables and are enclosed by a sealing compound.

* * * * *